(12) United States Patent
Schwarz, Jr. et al.

(10) Patent No.: US 12,198,282 B1
(45) Date of Patent: Jan. 14, 2025

(54) SYSTEMS AND METHODS FOR VIRTUAL PHYSICAL DISTANCING

(71) Applicant: UIPCO, LLC, San Antonio, TX (US)

(72) Inventors: Thomas Wayne Schwarz, Jr., Helotes, TX (US); Jeanie Graciela Lopez, San Antonio, TX (US); Janelle Denice Dziuk, Falls City, TX (US); Paula Ann Whittington, Helotes, TX (US); Donald Nathaniel Holloway, III, San Antonio, TX (US); Jennifer Hunt Erickson, San Antonio, TX (US); Will Kerns Maney, Jr., San Antonio, TX (US); Bradley Jay Billman, Celina, TX (US); Noe Alberto Martinez, San Antonio, TX (US); Jose L. Romero, Jr., San Antonio, TX (US); Bharat Prasad, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/494,973

(22) Filed: Oct. 26, 2023

Related U.S. Application Data

(62) Division of application No. 17/578,721, filed on Jan. 19, 2022, now Pat. No. 11,836,870.
(Continued)

(51) Int. Cl.
    *G08B 21/22* (2006.01)
    *G02B 27/01* (2006.01)
    (Continued)

(52) U.S. Cl.
    CPC ........ *G06T 19/006* (2013.01); *G02B 27/0101* (2013.01); *G02B 27/017* (2013.01);
    (Continued)

(58) Field of Classification Search
    CPC .. G06T 19/006; G06V 40/10; G02B 27/0101; G02B 27/017; G02B 2027/0138; G02B 2027/0178; G08B 21/22; H04W 4/80
    (Continued)

(56) References Cited

U.S. PATENT DOCUMENTS

| 2006/0191017 A1 | 8/2006 | Hieda |
| 2014/0364212 A1 | 12/2014 | Osman |

(Continued)

OTHER PUBLICATIONS

Non-Final Office Action mailed Feb. 3, 2023 for U.S. Appl. No. 17/578,721.
(Continued)

*Primary Examiner* — Jin Ge
(74) *Attorney, Agent, or Firm* — Plumsea Law Group, LLC

(57) ABSTRACT

A system and method for helping a user carrying a smart device to maintain safe distances from other persons during an epidemic or a pandemic. A portable smart device measures the approximate distance to persons in the vicinity of the user, and notifies the user whenever he or she is too close to other persons. The portable smart device may overlay augmented reality graphics (such as arcs, lines, text, numbers, or other graphics) over images captured by the smart device's camera, to indicate safe distances. The graphics serve to inform and/or warn the user that he or she may be getting too close to other persons.

20 Claims, 10 Drawing Sheets

Related U.S. Application Data

(60) Provisional application No. 63/138,939, filed on Jan. 19, 2021.

(51) Int. Cl.
*G06T 19/00* (2011.01)
*G06V 40/10* (2022.01)
*H04W 4/80* (2018.01)

(52) U.S. Cl.
CPC ............ *G06V 40/10* (2022.01); *G08B 21/22* (2013.01); *G02B 2027/0138* (2013.01); *G02B 2027/0178* (2013.01); *H04W 4/80* (2018.02)

(58) Field of Classification Search
USPC ........................................................ 345/633
See application file for complete search history.

(56) References Cited

U.S. PATENT DOCUMENTS

| | | |
|---|---|---|
| 2018/0090007 A1 | 3/2018 | Takemori |
| 2020/0160540 A1 | 5/2020 | Rastgar |
| 2020/0284605 A1* | 9/2020 | Sakai ..................... G01C 21/10 |
| 2020/0307617 A1 | 10/2020 | Sakai |
| 2020/0361482 A1* | 11/2020 | Choi ..................... B60W 40/08 |
| 2021/0190969 A1 | 6/2021 | Best |

OTHER PUBLICATIONS

Final Office Action mailed May 25, 2023 for U.S. Appl. No. 17/578,721.
Notice of Allowance mailed Jul. 26, 2023 for U.S. Appl. No. 17/578,721.

\* cited by examiner

SYSTEMS AND METHODS FOR VIRTUAL PHYSICAL DISTANCING

CROSS-REFERENCE TO RELATED APPLICATIONS

This application is a divisional of U.S. patent application Ser. No. 17/578,721, filed Jan. 19, 2022 and titled "System and Methods for Virtual Physical Distancing", which claims the benefit of Provisional Patent Application No. 63/138,939, filed Jan. 19, 2021, and titled "Systems and Methods for Virtual Physical Distancing". The entire disclosures of both applications are incorporated by reference herein.

TECHNICAL FIELD

This disclosure relates to systems and methods for virtual social distancing using augmented reality images displayed on a smart device.

BACKGROUND

Mitigating the spread of viruses, bacteria or other germs during epidemics or pandemics requires coordinated efforts by individual members of a society to limit the spread of infection. In particular, public health agencies recommend maintaining a minimum distance between people in such circumstances. This minimum distance may depend on the virulence of the virus or unrelated social factors, such as the vulnerability of the subject population. Establishments such as retail stores, restaurants, post offices, professional offices and other commercial or non-commercial premises that may remain open to the public during an epidemic or a pandemic may wish to implement policies to ensure access to their premises while complying with government policies during an epidemic or a pandemic. Such policies allow these establishments to continue operating as permitted during an epidemic or a pandemic while mitigating the spread of the viruses, bacteria or other germs.

For these reasons, there is a need for effective and convenient systems and methods for warning persons whenever they are getting too close to other persons in a public setting.

SUMMARY

In one aspect, embodiments include a smart device that has a camera, a display and a memory for storing images captured by the camera. It also has a physical distancing app that is configured to retrieve the images captured by the camera from the memory. The physical distancing app is also configured to generate graphics showing a boundary that delineates a safe distance from the camera. The physical distancing app is also configured to combine the graphics that delineate the boundary of the safe distance from the camera with images captured by the camera and stored in the memory to generate an augmented reality image showing the boundary overlaid onto the images captured by the camera and to display the augmented reality image on the display of the smart device.

In another aspect, embodiments include a method for assisting a person in maintaining a safe distance from at least one other person. The method includes capturing an image of a scene using a camera in a smart device and storing the image in a memory in the smart device. It then includes identifying the at least one other person appearing in the image captured by the camera and calculating a distance to the at least one other person appearing in the image captured by the camera. It also includes combining the image of the scene with additional graphics and displaying the combined image of the scene with the additional graphics to produce an augmented reality display on the smart device. The additional graphics provide warnings whenever the person is too close to the at least one other person.

In yet another aspect, embodiments include a smart device that has a camera and a memory configured to store the images captured by the camera. It also has a display configured to display the images captured by the camera and stored in the memory. There is a physical distancing app installed in the smart device. The physical distancing app is configured to identify images of persons in the images captured by the camera and to calculate physical distances from the camera to the persons whose images are displayed on the display. The physical distancing app is also configured to retrieve images captured by the camera from the memory and to combine the images captured by the camera with additional graphics that delineate safe distance boundaries. The physical distancing app is also configured to display the combined images on the display to produce an augmented reality display that delineates the safe distance boundaries in the images on the display.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings like reference numerals designate corresponding parts throughout the drawings.

DESCRIPTION OF EMBODIMENTS

Figure 1:
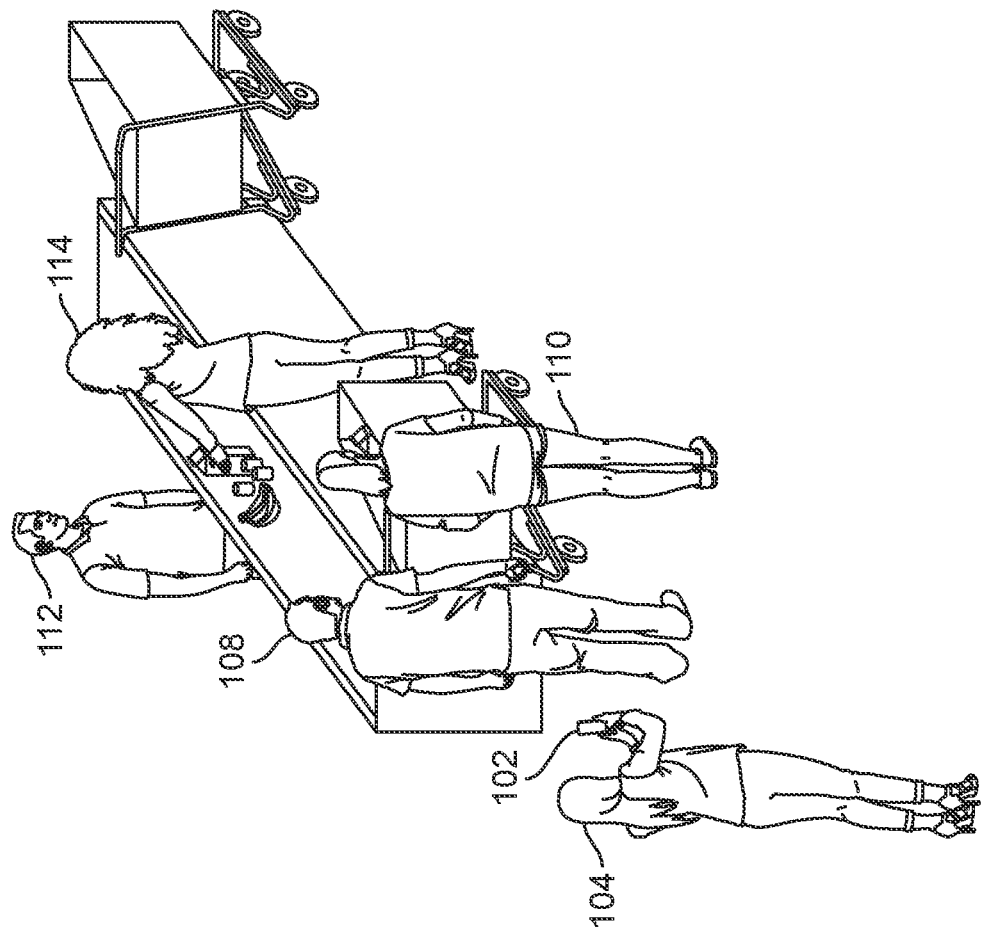
FIG. 1 is an illustration of a customer in a store using a smart device to ensure proper physical distance to nearby people, in an embodiment.

The embodiments disclosed herein provide systems, devices and methods for helping a user carrying a smart device to maintain safe distances from other persons during an epidemic or a pandemic. A portable smart device measures the approximate distance to persons in the vicinity of the user and notifies the user whenever he or she is too close to other persons. For example, the portable smart device may overlay augmented reality graphics (such as arcs, lines or text) over images captured by the smart device's camera, to indicate safe distances. The graphics serve to inform and/or warn the user that he or she may be getting too close to other persons. The augmented reality view may also indicate the distance to the nearest person(s) numerically, for example by adding the distance in feet to the display.

As used herein, the term "smart device" shall refer to any portable smart device, including, for example, smart phones, tablets or other smart devices that have a display showing images currently captured by the portable device's camera, and the processing power to analyze the images and/or calculate distances as described below. The term "public health policy" shall refer to a policy promulgated by a government entity related to protecting the public health. The term "corporate policy" shall refer to a policy established by a corporation regarding implementing a public health policy. The term "store policy" shall refer to a policy established by a local store regarding implementing a public health policy. The measured distances referred to herein are only approximate, and the distances may only be measured to within +/−10% or to within +/−5%.

Dealing with pandemic outbreaks generally requires coordinated efforts by individual members of a society to limit the spread of infection. In particular, public health agencies recommend maintaining a minimum distance between people in such circumstances. This minimum distance may depend on the virulence of the virus or unrelated social factors, such as the vulnerability of the subject population. Moreover, stores or other premises open to the public may wish to implement their own policies to ensure equal access to their premises while avoiding overcrowding in these circumstances.

In an open society, adopting such public health norms depends on the co-operation of the public. Deploying technological solutions involving technology that is already widespread can make this adoption easier and more effective. A large segment of the public has access to portable smart devices such as smartphones and tablets or possibly other devices, and frequently carry these devices with them when they are out in public. For that reason, the embodiments disclosed herein leverage the ubiquity and technological sophistication of smart devices to help persons comply with public health directives during an epidemic or a pandemic, specifically by allowing users to maintain proper distances to other persons.

Smartphone technologies that allow determination of the distance between identified objects and the user are well known in the art, for example through the use of apps that rely on parallax to measure distances, or in some cases other technologies, such as LiDAR or other laser-based distance determination technologies. These technologies may then be used by image analysis and digital image processing algorithms to distinguish persons from other objects and to measure the approximate distances to these persons. Image analysis and digital image processing algorithms can then be applied to multiple views of the same scene to measure the distance to other persons by using parallax effects, for example.

Live video images captured by the smart device's camera may be overlaid with graphics to inform the user as to his or her distance from other persons. These and similar technologies are generally referred to as "augmented reality" (AR) technologies. Making use of these AR technologies, the embodiments disclosed herein teach systems, methods, and devices that allow users to maintain a proper distance from other people. In some embodiments, the systems, methods, and devices facilitate implementing policies designed by an outside organization (such as corporation, a university, a school or a store) to aid in the maintenance of such physical distancing norms and prevent overcrowding.

FIG. 1 is an illustration 100 of a customer 104 in a store using a smart device 102 to ensure proper physical distance to nearby persons 106, 108, 110, 112, and 114, in an embodiment. These physical distancing protocols may have been promulgated owing to a pandemic or an epidemic. However, in some cases they may need to be implemented during other kinds of situations, such as during a security threat or in an institution that requires physical distancing in some other context. Note that in a situation such as the one shown in illustration 100, in which people are congregating for an extended period of time because they are waiting in line, it is crucial for people to maintain proper distancing protocols, because increased exposure to pathogens may be associated with worse health outcomes. As shown in illustration 100, customer 104 holds smart device 102 up, so that it can capture live or contemporaneous video images of the persons in front of her, such as persons 108, 110, 112, and 114, to determine if they are at a safe distance from customer 104, as determined by specified public health protocols. In some embodiments, an app running on device 102 would remind customer 104 to turn around, whereby customer 104 could determine whether or not persons behind her, such as person 106, are far enough away as required by the public health protocols.

The video images captured by smart device 102 are stored in a memory on the smart device. The images may be overlaid with graphics to provide the user with an augmented reality view of the scene in front of her, so that she can determine when to stop moving forward, for example. For example, the images displayed on smart device 102 may show one boundary or several boundaries delineating the safe distance around the user, so that she can stop moving forward when one or more of the boundaries reaches the persons in front of her, for example, as illustrated in FIG. 2, as described below.

Figure 2:
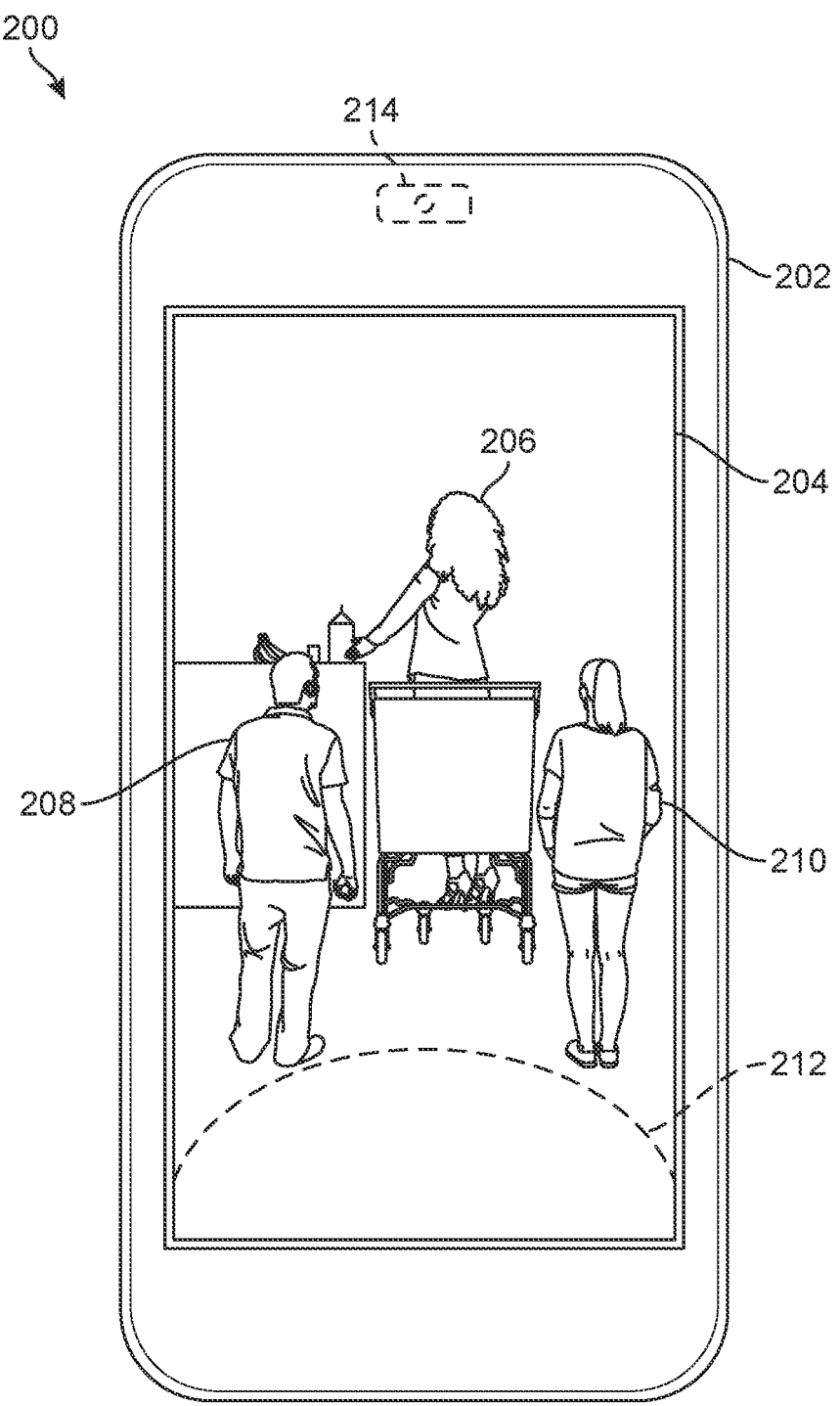
FIG. 2 is an illustration of a display on a smart device that displays a safe distance to other nearby customers, in an embodiment.

FIG. 2 is an illustration 200 of a user display 204 on a smart device 202 carried by a user, such as customer 104 shown in FIG. 1. Display 204 shows a boundary 212 that defines the safe distance to other nearby customers 206, 208, and 210 in an embodiment. Smart device 202 contains a physical distancing app (shown in FIG. 5) that can recognize images of persons in the images captured by the camera on the smart device, and distinguish those images from images of other objects. Boundary 212 appears on display 204 as an arc of a set radius, overlaid on a video feed of the image captured by camera 214 in smart device 202. This radius may be based upon promulgated public health protocols. In illustration 200, customers 206, 208, and 210 are beyond boundary 212, so no further device actions are necessary to aid the user of device 202 in maintaining proper physical distancing protocols. Although FIG. 2 only shows one boundary, in general, the image may display more than one boundary, for example because one segment of an arc is obscured by some object, but the arc continues establishing another boundary on the other side of that object.

Figure 3:
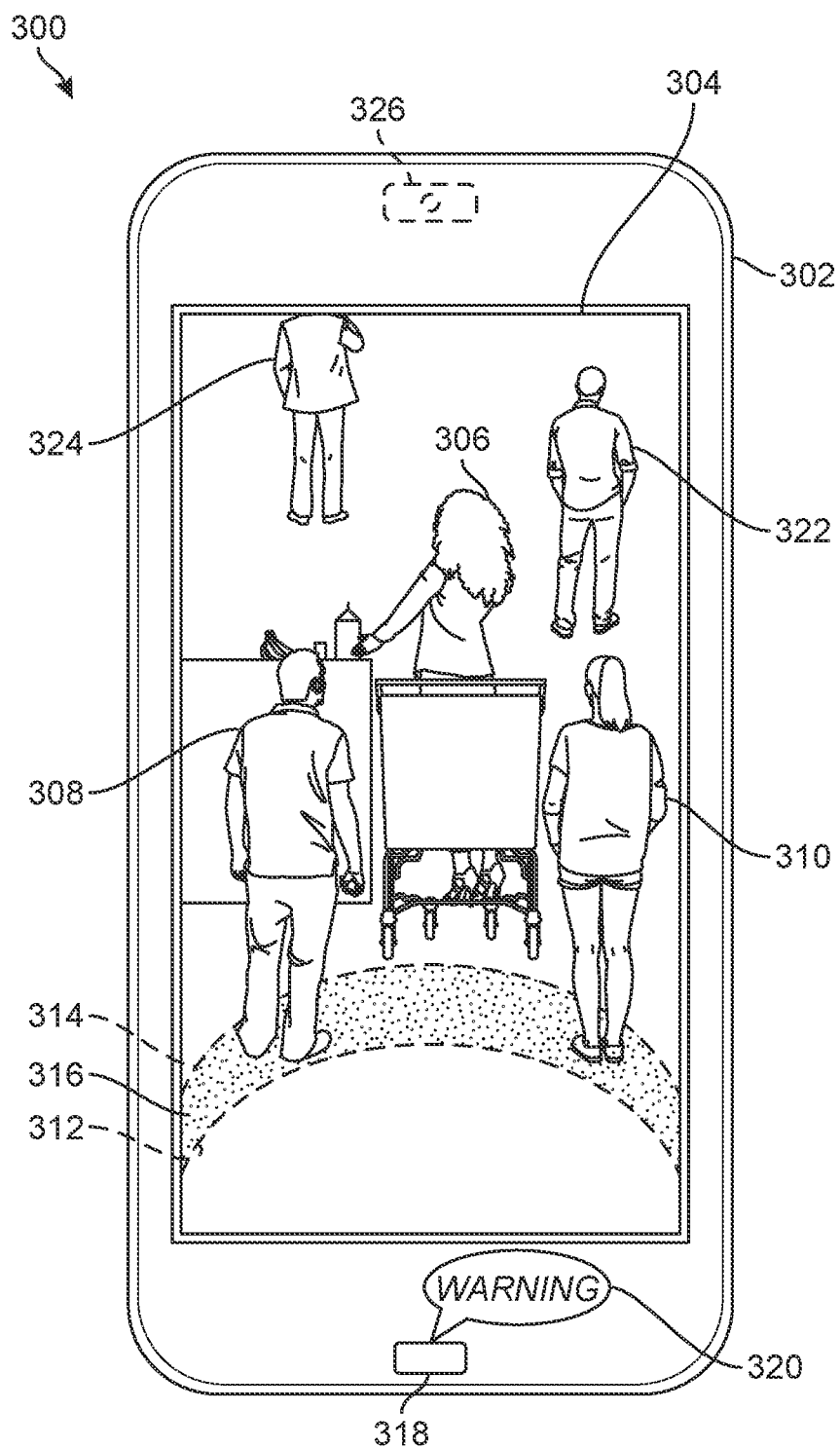
FIG. 3 is an illustration of a display on a smart device that warns a user when other customers are too close, in an embodiment.

FIG. 3 is an illustration 300 of a display 304 on a smart device 302 which notifies the user via visual warning 316 (and/or in some embodiments an audio warning 320) when other customers are closer than a safe distance. In this illustration, customers 308 and 310 are closer than the specified safe distance 314 to the user of device 302, whereas customer 306, customer 322 and customer 324 are beyond safe distance 314 from the user of device 302. A video feed of the scene captured by camera 326 in smart device 302 is displayed on user view 304, overlaid with a visual warning 316. Visual warning 316 is shown in FIG. 3 as a region between two arcs. The arcs define boundaries showing that the persons are too close (boundary 312) and the person holding the smart device needs to move back so that boundary 314 is moved to approximately where boundary 312 is in FIG. 3.

As noted above, in these embodiments, the warnings may include a visual warning 316 shown on display 304, an audible warning 320 emitted by speaker 318, or both a visual warning and an audible warning. Visual warning 316 may be represented in several ways, for example, by a bright red (or other color) band across the arc delineated by arc 314 and arc 312. These colored bands may be displayed on display 304 of smart device 302. As is well known in the art, such overlays are used to create an "augmented reality" display on smart device 302. In this embodiment, colored region 316, delineated by dashed lines 312 and 314, is overlaid on the image captured by camera 326 of device 302 and displayed on the display of device 302 to emphasize that customers 310 and 308 are closer than the safe distance from the user of device 302. Visual warnings may be more useful than audible warnings, since they can generally convey more information because they show specifically where the problem is, and how the user may move in order to return to a safe distance. In some cases, the arcs may be interrupted, so that the image displays several boundaries instead of just one.

However, in some cases an audible warning may be more effective than a visual warning. For example, if the user happens to be looking away from her smart device, a warning message emitted by speaker 318 explaining that there are persons closer than the safe distance to the user of device 302 may be more effective than the visual warning on the display. Also, if the user is listening to music on her headphones, an audio warning interrupting the music would be effective in grabbing the user's attention. In some cases, the audible warning is used as a backup to the visual warning. Thus, if the user does not respond quickly to the visual warning, the audible warning may be emitted to supplement the visual warning.

Figure 4:
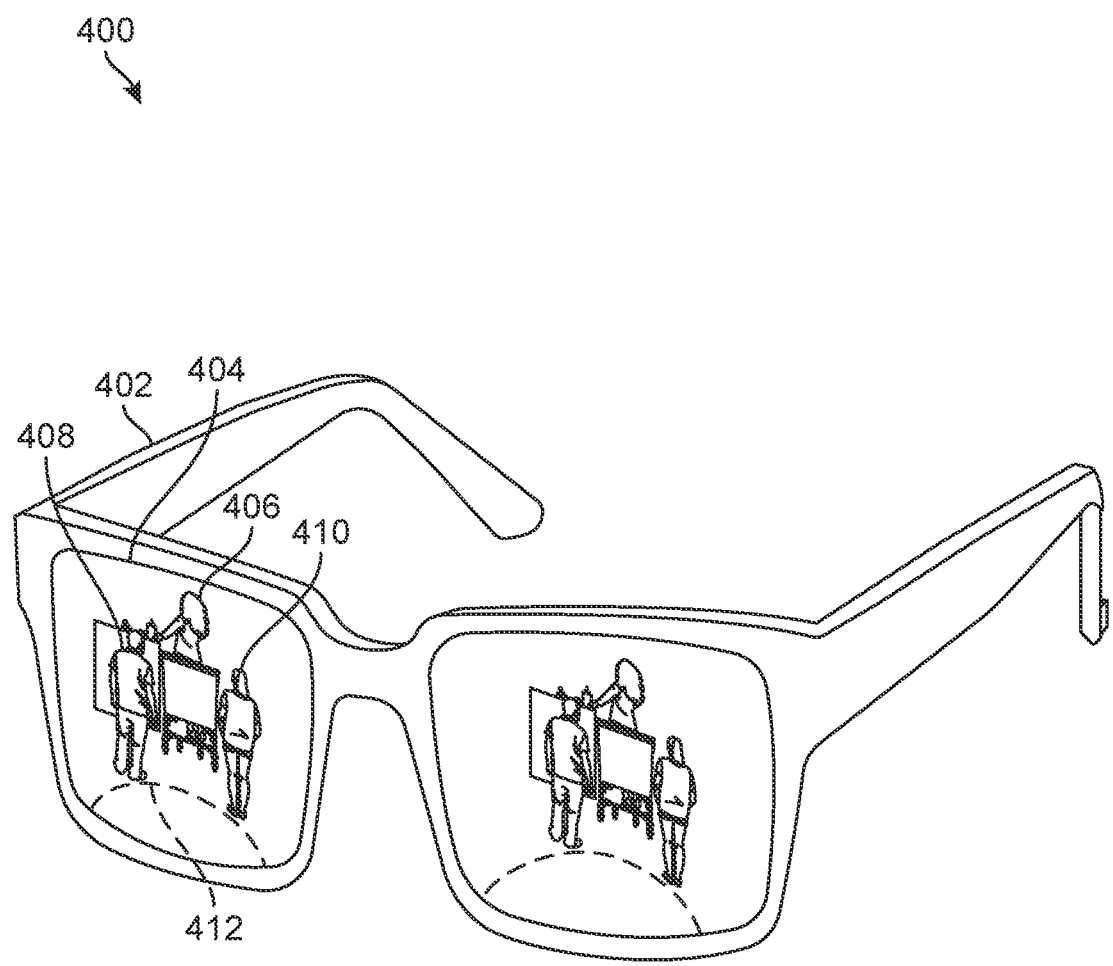
FIG. 4 is an illustration of a display on a "smart glasses" device that displays a safe distance to nearby customers, in an embodiment.

FIG. 4 is an illustration 400 of an embodiment in which a display 404 of a "smart glasses" device 402 may be used to alert a user that he or she is too close to other persons. In this embodiment, smart glasses device 402 may be in communication with a smart device (such as a smart phone or a tablet) over a wireless connection such as Bluetooth or NFC technologies, so that it may use the memory and processing power of the smart device. In other embodiments, smart glasses 402 may already include all the memory and processing power needed to implement the embodiments disclosed herein. Display 404 shows that the user wearing smart glasses 402 is at a safe distance from nearby customers 406, 408, and 410, because they are farther away than arc 412 that marks the beginning of the safe distance. Such smart glasses are well known in the art and may, for example, include imprinted circuits and devices on the lenses. Such smart glasses are thus well suited for "augmented reality" applications. In this embodiment, the user of "smart glasses" device 402 need only look at nearby customers 406, 408, and 410 for safe distance 412 to be displayed on the lenses of the smart glasses. The user does not need to point his or her smart device forward as in the embodiment illustrated in FIG. 1. In some embodiments, the user may turn off the AR capability at his or her discretion.

Figure 5:
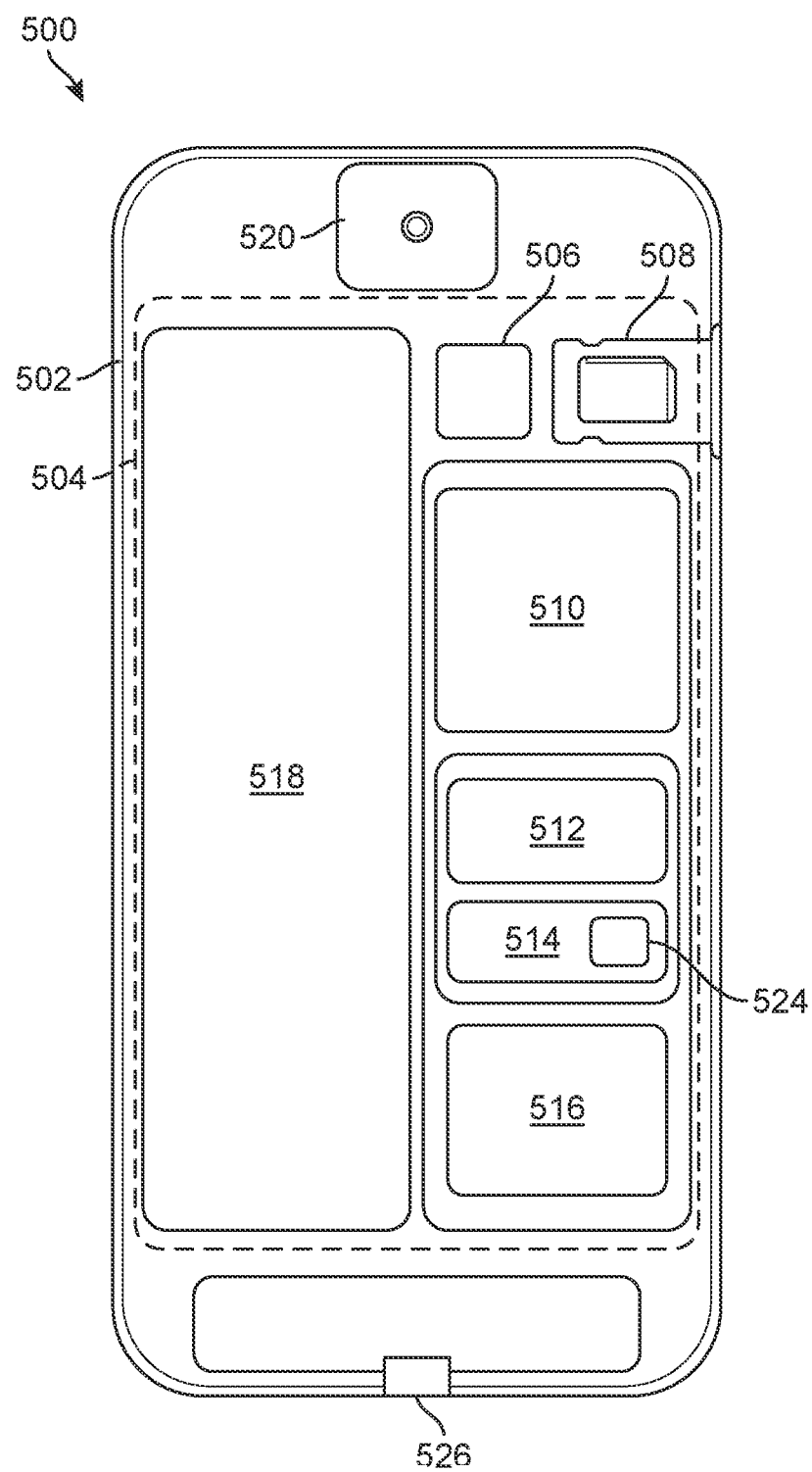
FIG. 5 is a schematic diagram of a smart device showing components that may be used to execute safe distancing procedures, in an embodiment.

FIG. 5 is a schematic diagram 500 of a device 502 showing the components involved in a system for maintaining proper physical distance to other people in an embodiment. Device 502 includes a battery 518 which powers device 502. Device 502 includes a GPS unit 506 which can use a GPS signal to determine the device's location. Device 502 includes a SIM card 508 which identifies device 502 so that it can register on nearby cellular networks. Device 502 includes a communication module 512 associated with other wireless communications technologies, such as NFC, WiFi, and Bluetooth technologies. In embodiments (described below) in which device 502 connects to a local server which provides device 502 with, for example, a retail store's additional mandated physical distancing policies, such as policies designed to prevent overcrowding, communication module 512 may provide the link with which such a policy is loaded to device 502. Device 502 includes a connection module 516 associated with wired connections to device 502, such as connections designed to charge battery 518.

Device 502 includes a processing unit 510 which acts as a control module for the components of device 502. A physical distancing app 524 resides in a memory 514. Physical distancing app 524 can recognize images of persons in the images captured by camera 520. Physical distancing app 524 may provide instructions to processing unit 510 so that it can calculate distances to nearby persons recognized in the images, calculate safe distance arcs, and display or emit warnings if the persons are within the boundaries defined by the safe distance arcs. In other embodiments, app 524 may be stored in a separate location or even in a separate device that is in communication with the smart device. Device 502 includes a camera 520 which produces a video feed from which distances to nearby persons can be determined and over which safe distances may be displayed. In this embodiment, images taken from the video feed are stored in memory 514 for digital image processing by physical distancing app 524. Physical distancing app 524 processes incoming images stored in memory 514 to determine if persons are present in the image and if so, undertakes additional image processing on stored images to determine the likely distances to those persons. For example, app 524 may determine the distance to persons in the user's vicinity based upon parallax as the smart device is moved from one position to another in a predetermined motion. Device 502 includes a display 504 which displays the video feed and any overlays, including safe distance arcs and visual warnings, the physical distancing app 524 has generated based on the likely distances to nearby persons determined from the stored images. Device 502 includes a speaker 526 which issues any audible warnings the physical distancing app 524 has generated.

In an alternative embodiment, smart device 502 includes specialized distance determining technologies, including laser-based distance determining technologies, such as LiDAR. In this alternative embodiment, laser-based distance determining technologies are incorporated into smart device 502 which can emit a laser beam, detect the reflected laser beam as it is reflected from persons in the vicinity, and measure the time-of-flight for the laser beam reflected by nearby persons. These time-of-flight measurements are then input into algorithms for determining distances to nearby persons and for calculating and then displaying a safe distance arc.

Figure 6:
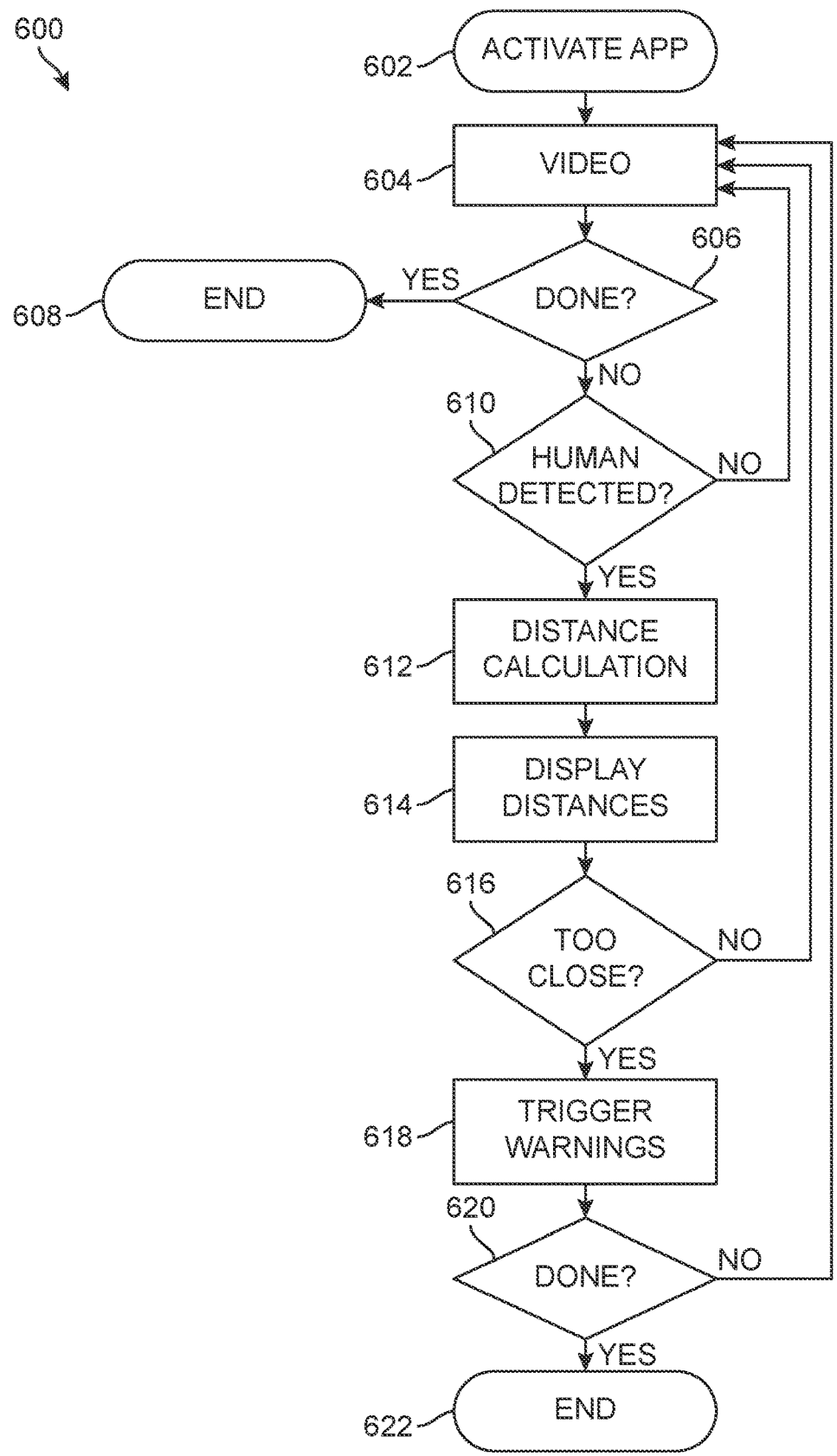
FIG. 6 is a flowchart showing an exemplary method that a smart device may use to help persons maintain safe physical distances, in an embodiment.

FIG. 6 is an illustration of an exemplary flowchart 600 that outlines a method by which a smart device may help a user maintain a safe physical distance to other people, in an embodiment. The method begins in step 602 when a physical distancing app running on the smart device is activated. Such activation could be initiated by user action or, in an embodiment in which the device connects to a local server to receive additional mandated physical distancing policies (for example by a local server in a retail establishment), by the local server itself. The method continues in step 604 as successive images of the scene in front of the user are taken by a camera associated with the smart device, and are stored in the smart device's memory, and are also displayed on the device display. In some embodiments, the user initiates this action by moving the device in a small circle or back and forth in a linear transverse motion, which indicates that the user would like to know the distance to any persons present in front of them, and allows the camera to obtain images of the scene at multiple angles, thus increasing the accuracy of its parallax-based distance measurements.

At step 606, the physical distancing app checks to see if the user has indicated he or she is done and no longer needs the app. In some embodiments, such an indication occurs when the user touches a designated section of the device display. If so, the method ends at step 608. If not, the method continues at step 610 as images are subject to image analysis to determine if human beings are present in the images. Image analysis algorithms for this purpose are well known in the art. In some embodiments, additional image analysis is undertaken to determine if there are elements present in the images that would increase the accuracy of any distance determinations made by the physical distancing app. For example, heights and other dimensions of shelving in a store are frequently standardized or could be disclosed by a local server in communication with the physical distancing app. In some embodiments, a store or other public establishment could have patterns of sets of stripes on the floor or the pavement indicating positions that are at a safe distance from each other. The distance between the stripes may be set at the standard distance required by the current public health policy, such as six feet or 10 feet, for example. These patterns could also be used as part of a calibration routine implemented by the physical distancing app.

If image analysis suggests that there are no human beings present in the captured images, then the method returns to step 604. If image analysis suggests that there are persons present in the stored images, then at step 612 the stored images are subjected to further image analysis to estimate the distance to the identified persons present in the stored images.

At step 614, the physical distancing app overlays the determined distances to the identified persons on the video feed from the device camera. In some embodiments, this overlay includes an arc delineating the limits of the safe distance. In some embodiments, a numerical distance and an estimated error in the distance measurement may be displayed on the smart device's display. In some embodiments, this overlay uses color codes to indicate persons that are far enough away from the device (for example, in green), too close to the device (for example, in red), or nearly too close to the device (for example, in yellow). In some embodiments, a safe distance arc is overlaid on the video from the device camera, as shown in the example of FIG. 2. In some embodiments, distances to any identified standardized elements present (such as stripes on the floor or pavement or shelving of known height) are used in addition to the distances to any identified persons to overlay the safe distance arc on the displayed video feed.

At step 616, the physical distancing app determines if any of the identified persons are close enough to the device to trigger warning. In some embodiments, such a warning distance could be set by the user. In some embodiments, such a warning distance is determined by a policy downloaded from a local server, for example, a local server operated by a store the user has entered. If the physical distancing app determines that there are no persons who are too close, then the method returns to step 604. If the physical distancing app determines that there are persons within the specified warning distance, then in step 618 the app triggers a set of warnings to the user. In some embodiments, this set of warnings includes an audio message issued to the user explaining that there is a person too close to the user. In some embodiments, this warning includes a visual overlay on the display indicating by color coding, by shading or by a textual message that there is a person too close to the user. In some embodiments, these warnings are continually issued to the user until the user indicates by touching the screen that he or she has acknowledged the warning. At step 620, the physical distancing app checks to see if the user has indicated that he or she would like to terminate the app. In some embodiments, such an indication occurs when the user touches a designated portion of the display. If such an indication occurs, then the method ends at step 622. If such an indication has not occurred, then the method returns to step 604.

In an alternative embodiment in which the device includes specialized distance-determining technologies, such as LiDAR or other lased-based distance measuring technologies, the distance determination from the image analysis steps of the method may be replaced by calls to the modules controlling those parts of the device that implement the distance-determining technologies.

Figure 7:
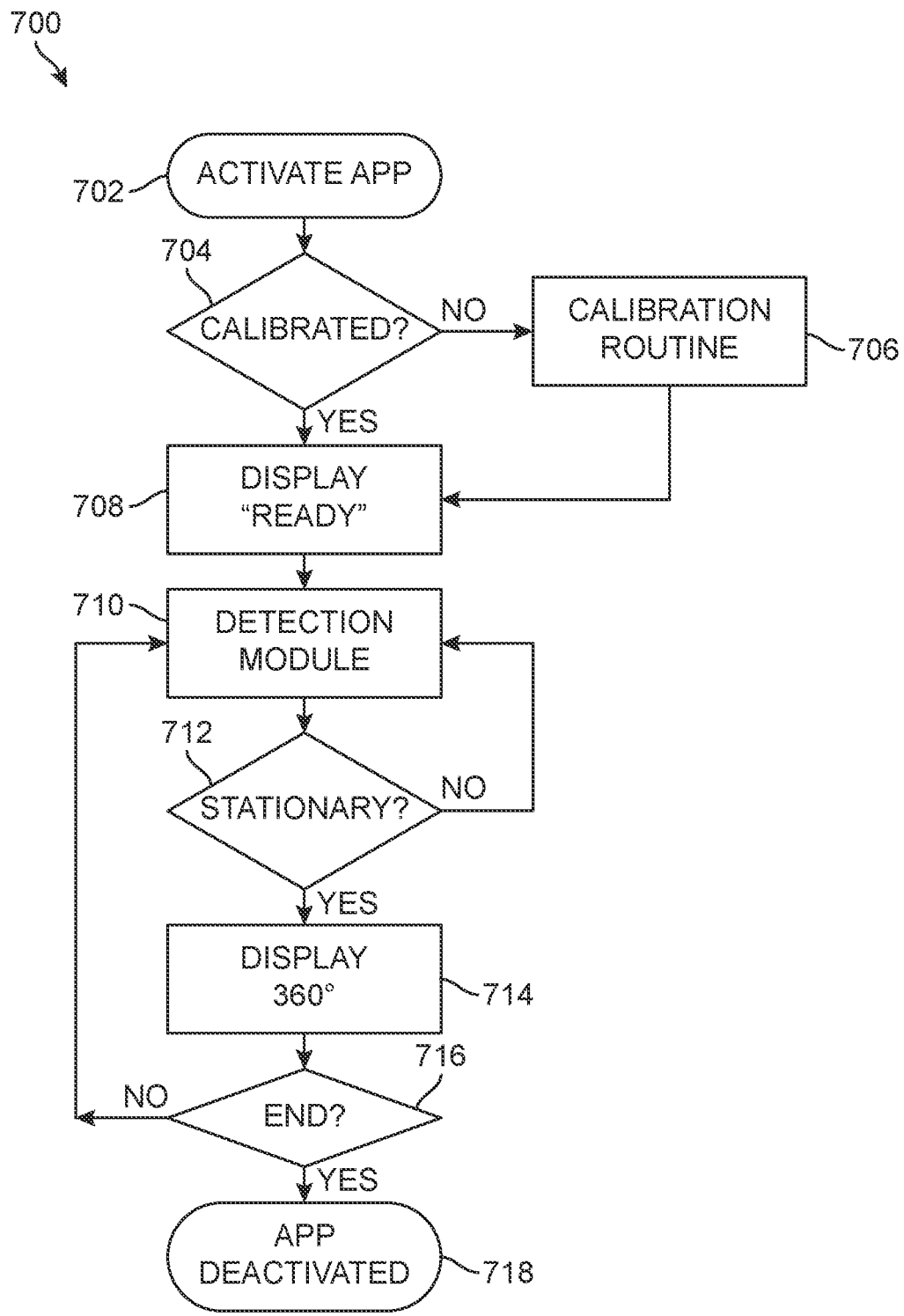
FIG. 7 is a flowchart showing an exemplary method that a smart device may use to help persons maintain safe physical distances, in another embodiment.

FIG. 7 is a flowchart 700 outlining a method a smart device may use to help a user maintain a safe physical distance to other people, including people that may be behind them, in a further embodiment. The method begins at step 702, when the physical distancing app is activated. At step 704, the physical distancing app determines if it has stored any required calibration information it may need to operate. In some embodiments, the physical distancing app polls a device control module to determine the focal length and angle of view of the lenses associated with the device camera to perform this calibration. In other embodiments, the user may calibrate the distance measurements by measuring the distance to a certain object or to stripes on the floor, and if necessary moving the smart device laterally for a given distance, to calibrate a parallax method for determining distances. Parameters based on these exercises may be input into the algorithms the physical distancing app uses to determine distances to nearby persons. In embodiments in which the user is required to move the device in a prescribed motion in order to make distance determinations, the calibration may consist of teaching the user to move the device laterally for a given distance so that the distance determinations can be made with reasonable accuracy. If such calibration is required then at step 706, the calibration routine is performed and the method advances to step 708. If the calibration routine is not required, the method advances directly to step 708. In some embodiments, the calibration routine may have been executed at an earlier time.

At step 708, the physical distancing app indicates it has been calibrated by displaying, for example, "Ready" on the device display. At step 710, the physical distancing app makes a call to a "stationary detection module" to determine if the user is stationary for a pre-determined time period. Note that a stationary user (for example, a user standing in line) could be subject to increased exposure to pathogens if there are any human beings too close to the user. For that reason, such a user has both the opportunity and motivation to ensure there is not anyone behind the user that could be too close. In some embodiments, the stationary detection module receives data from a device accelerometer to determine if the user is stationary or not. In some embodiments, the stationary detection module receives data from the smart device camera or from a GPS component to determine if the user is stationary.

If the physical distancing app receives a response from the "stationary detection module" at step 712 indicating that the user has been stationary for a pre-set amount of time, then at step 714, the physical distancing app displays a message to the user via the device display instructing the user to turn 360 degrees so the device can determine distances to any nearby human beings during the duration of this turn. Then, at step 716, the physical distancing app determines if the user wishes to terminate the app. In some embodiments, such a determination consists of determining if the user has touched a designated section of the display. If the user wishes to terminate the app, then the physical distancing app is deactivated and flowchart 700 ends at step 718. Otherwise, flowchart 700 returns to step 710.

If the physical distancing app receives a negative response from the "stationary detection module", then the method returns to step 710 and the process continues with step 712. The steps in flowchart 700 may exist in parallel with other steps or methods executed by the physical distancing app, and do not outline the sole functioning of the physical distancing app.

Figure 8:
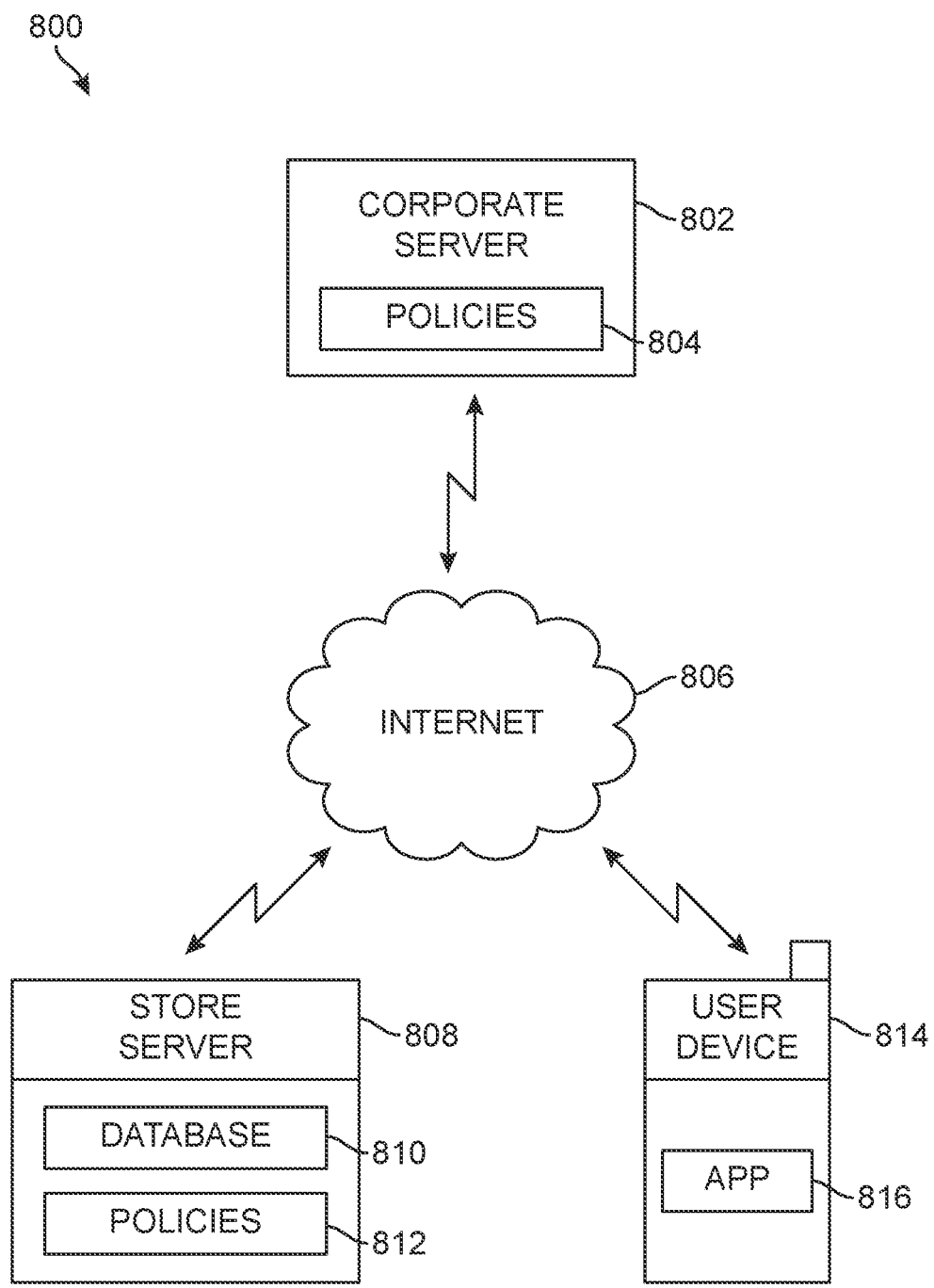
FIG. 8 is a schematic diagram of an exemplary network for implementing mandated physical distancing policies, in an embodiment.

FIG. 8 is a schematic diagram 800 of a network for implementing physical distancing policies on a device 814 in an embodiment. In this embodiment, a store server 808 is connected via internet 806 to a user device 814 and a corporate server 802. Corporate server 802 stores a set of public health policies 804 to be implemented at its franchise locations. For example, such policies could mandate time limits for customers entering the franchise locations to minimize overcrowding while still allowing some degree of access to the public, and may include an identification of aisles restricted to one-way traffic. Public health policies 804 are transmitted over Internet 806 and stored in a corporate policies database 812 in store server 808. In this embodiment, store server 808 also includes a database 810 containing local store information. Such a database 810 would be appropriate if, for example, the store was located in an area more heavily impacted by a pandemic and if a local government agency has mandated more stringent measures regarding the store's operation than are contained in set of public health policies 804 and 812 (that may be nationwide or statewide, for example). For example, such a stricter policy could mandate a shorter time limit allowing customers to be present in the local store. In the event the local store sets up such a database, its polices may generally supersede any portion of the set of public health policies 804 and 812 that are in conflict with or are less strict than the local policies.

In this embodiment, when physical distancing app 816 on user device 814 is activated, it sends out a local signal to determine if there exists any server, such as store server 808, which has a policy associated with physical distancing app 816. In some embodiments, user device 814 may seek to connect to a router associated with the store and thereby communicate, for example over a local WiFi network or over the Internet, with store server 808 to determine if it contains any policies pertaining to physical distancing app 816. In this situation, store server 808 sends user device 814 a set of corporate policies 812 and/or local policies stored in database 810, which are then stored in association with physical distancing app 816 and implemented by physical distancing app 816. In some embodiments, database 810 could also include local parameters that physical distancing app 816 could use to increase the accuracy and speed of its distance determinations—for example, the location of distancing stripes on the floor, or the height of shelves that could be identified in the images taken by user device 814.

Figure 9A:
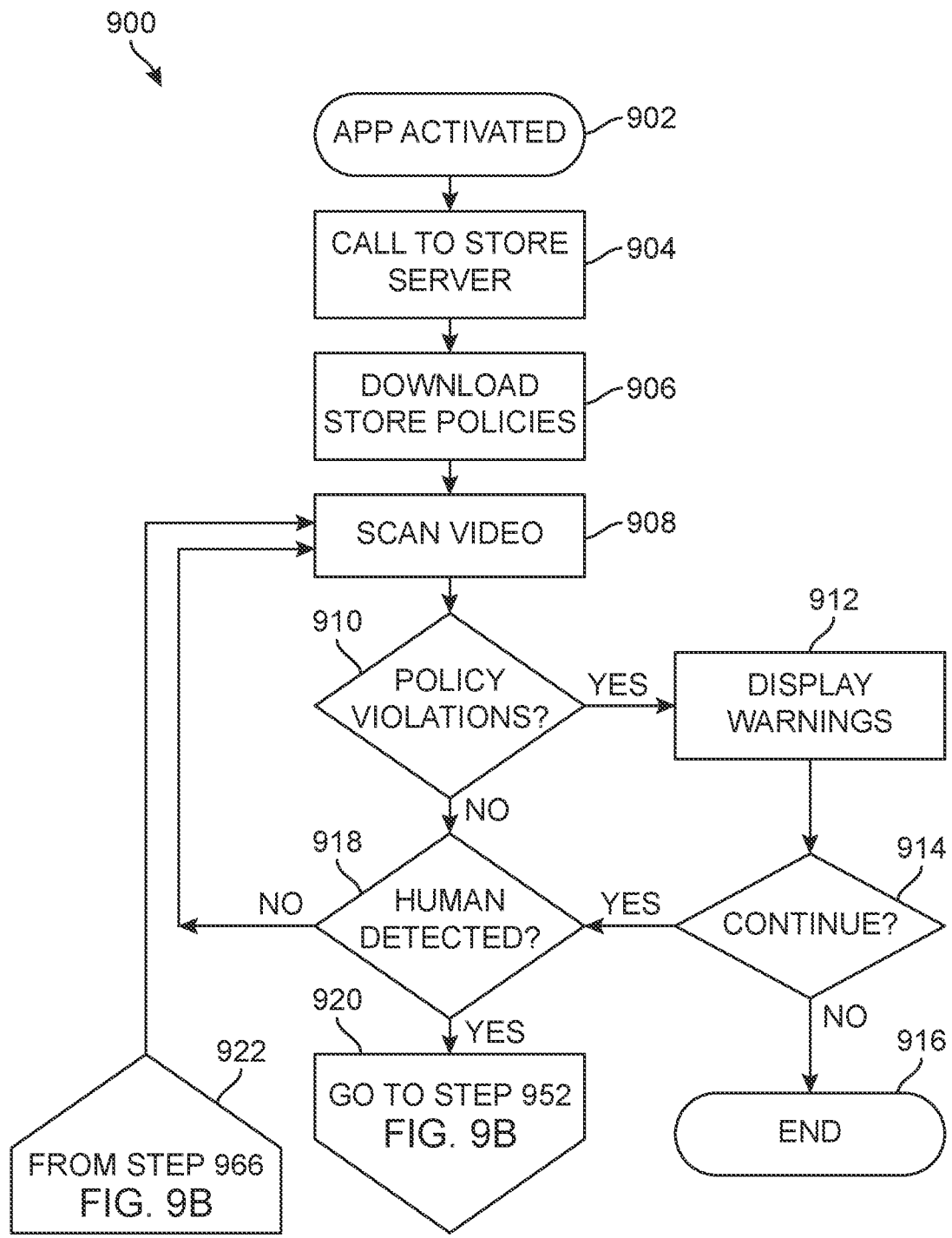
FIG. 9A and FIG. 9B together illustrate a flowchart of an exemplary method for helping users to comply with physical distancing policies, in an embodiment.
Figure 9B:
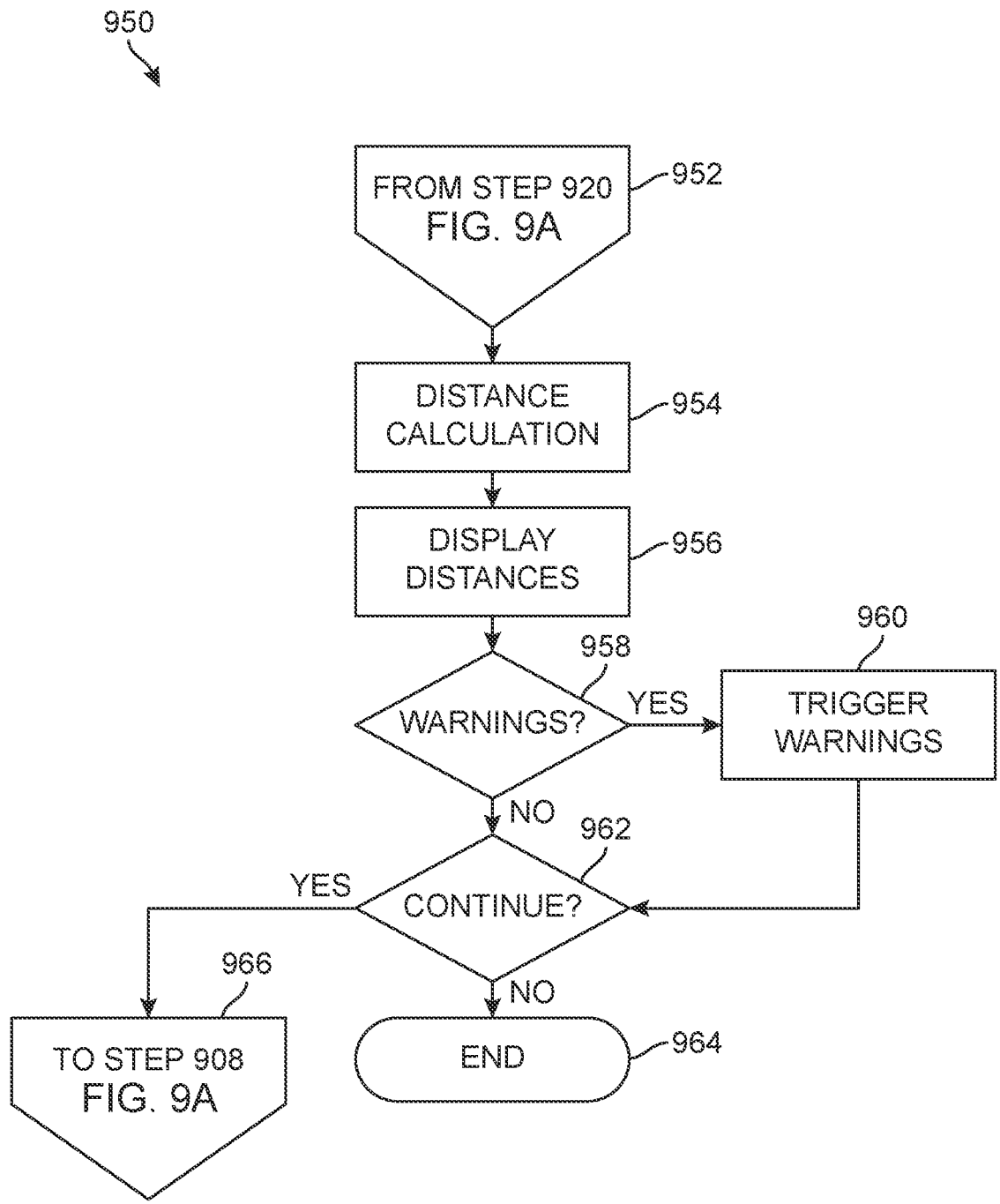

FIG. 9A and FIG. 9B display an exemplary flowchart, with a first portion 900 shown in FIG. 9A and a second portion 950 shown in FIG. 9B. This flowchart shows a method by which a smart device may help a user follow mandated or discretionary physical distancing policies, in an embodiment. The method begins at step 902, when a physical distancing app on a smart device is activated. At step 904, an app in the smart device makes a call to a store server for any policies or parameters germane to the physical distancing app stored by the store server, and downloads those policies and parameters at step 906. These policies or parameters could include the radius of a safe distance arc; time limits for shopping; or any store specific data (such as those described above) that could aid the physical distancing app in its distance calculations.

At step 908, the method continues as the physical distancing app directs a camera associated with the smart device to take successive images of the scene in front of the user. The successive images are then are stored in a memory on the smart device and displayed on the device display. At step 910, the physical distancing app checks to see whether any policy violations have occurred. For example, in an embodiment in which the policy limits the amount of time a customer may shop, the physical distancing app simply checks to see if the amount of time elapsed since the app has been activated exceeds the specified time limit.

If a policy violation has occurred, at step 912 the physical distancing app directs a warning to be displayed to the user pertaining to the policy violation. At step 914, based on the policy, the physical distancing app determines whether it should continue. If the policy indicates that the method should end, then at step 916 the user is informed that the method should end, and the app may be deactivated. For example, if a shopping time limit has expired, the physical distancing app may inform the user that his or her time to shop has elapsed, and may direct the user to check out.

If the policy does not direct the physical distancing app to deactivate itself or if no policy violations have occurred at step 910, then the method continues at step 918. At step 918, the stored images are analyzed to determine if any human beings are present in the scene. If there are no human beings present in the scene, then the method returns to step 908. If analysis indicates that there are human beings present in the scene, then the method continues at step 920. At step 920, flowchart 900 continues with step 952 of FIG. 9B which shows the second portion 950 of the flowchart. (Note that step 966 of FIG. 9B returns the method of FIG. 9A and FIG. 9B to step 908 of flowchart 900—this is indicated on FIG. 9A as step 922).

From step 952, second portion 950 of the flowchart continues with step 954 where the physical distancing app calculates the distance to any persons that were determined to be present in the scene at step 918. At step 956, the physical distancing app overlays the video images obtained in step 908 with distance-related graphics, such as an arc delineating the safe distance, for example, or textual or numerical information, to create an augmented reality display combining the video images and the distance information. The augmented reality display may include the numerical distance to each identified human being and any associated error information for each distance calculation. This information may be displayed over the video feed from the camera on the smart device display. At step 958, the physical distancing app determines if it needs to issue any warnings to the user based on the calculated distances to each of the identified persons. In some embodiments, such a determination is made using a safe distance specified by the policy stored in the store server. In other embodiments, such a determination is made using a safe distance input by the user, for example, during app set-up and initialization. If warnings are required, then at step 960, the physical distancing app triggers the smart device to issue a set of warnings to the user and the process continues at step 962. In some embodiments, such warnings include graphical overlays on the video feed from the device camera displayed on the device screen warning the user that there is a human being closer to them than the minimum safe distance, as well as possible audible warnings.

If no warnings were required at step 958, then the method also continues at step 962. At step 962, the physical distancing app checks to see if the user wishes to continue. In some embodiments, the user could indicate this by touching a designated "Continue" section of the screen. In other embodiments, the user may indicate this by responding with a "yes" or a "no" to a "Continue?" question displayed on the smart device's screen. In other embodiments, the use may provide an audible answer. Other ways for allowing a user to indicate whether or not to continue may alternatively be implemented instead. If the user has indicated he or she would like to continue, the method returns via step 966 to step 908 shown in FIG. 9A via step 922 of first portion 900 of the flowchart. If the user does not wish to continue, then the method ends at step 964.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A smart device comprising:
a camera and a display;
a memory for storing images captured by the camera; and
a physical distancing app to retrieve the images captured by the camera from the memory, to determine a safe distance using a distance between stripes placed on a floor indicating positions that are a safe distance from each other, to calibrate distance measurements of the camera using the stripes, to instruct a user of the camera to turn the camera when the user is determined to have been stationary for a predetermined period of time so that the camera can determine distances to nearby human beings, to generate graphics showing a boundary that delineates the safe distance from the camera, and to combine the graphics that delineate the boundary of the safe distance from the camera with images captured by the camera and stored in the memory to generate an augmented reality image showing the boundary overlaid onto the images captured by the camera and to display the augmented reality image on the display of the smart device.

2. The smart device of claim 1, wherein the physical distancing app is configured to recognize at least one image within the images captured by the camera as an image of a person.

3. The smart device of claim 2, wherein the physical distancing app generates warnings whenever the person is closer than a predetermined distance from the smart device.

4. The smart device of claim 3, wherein the warnings comprise textual warnings on the display.

5. The smart device of claim 3, wherein the warnings comprise audible warnings.

6. The smart device of claim 2, wherein the boundary overlaid onto the image changes its color on the display when the camera is closer than the safe distance to the person.

7. The smart device of claim 1, wherein the boundary is an arc and the augmented reality image comprises the arc and textual warnings in combination with the images captured by the camera.

8. The smart device of claim 1, wherein the smart device displays the augmented reality images on a pair of smart glasses.

9. The smart device of claim 1, wherein the physical distancing app downloads physical distancing policies from at least one of a corporate server and a local server.

10. The smart device of claim 1, wherein the physical distancing app instructs the person to move the smart device in a predetermined pattern.

11. A smart device comprising:
a camera;
a memory to store the images captured by the camera;
a display to display the images captured by the camera and stored in the memory; and
a physical distancing app installed in the smart device to identify images of persons in the images captured by the camera, to calculate physical distances from the camera to the persons whose images are displayed on the display, to retrieve images captured by the camera from the memory, to determine a safe distance using a distance between stripes placed on a floor indicating positions that are a safe distance from each other, to calibrate distance measurements of the camera using the stripes, to instruct a user of the camera to turn the camera when the user is determined to have been stationary for a predetermined period of time so that the camera can determine distances to nearby human beings, to combine the images captured by the camera with additional graphics that delineate safe distance boundaries, and to display the combined images on the display to produce an augmented reality display that delineates the safe distance boundaries in the images on the display.

12. The smart device of claim 11, wherein the physical distancing app downloads at least one of a corporate policy and a local store policy.

13. The smart device of claim 12, wherein the determination of the safe distance boundaries is based in part on the at least one of the corporate policy and the local store policy.

14. The smart device of claim 11, wherein the smart device comprises a laser-based distance determining system.

15. The smart device of claim 11, further comprising smart glasses in communication with the smart device that display the augmented reality image.

16. The smart device of claim 11, wherein the augmented reality image includes a colored region overlaid over images captured by the camera.

17. The smart device of claim 11, wherein the physical distancing app comprises image analysis and digital image processing algorithms to distinguish between persons and other objects in the images captured by the camera and to measure distances to each person.

18. The smart device of claim 11, wherein the physical distancing app generates warnings whenever the person is closer than a predetermined distance from the smart device.

19. The smart device of claim 18, wherein the warnings comprise textual warnings on the display.

20. The smart device of claim 18, wherein the warnings comprise audible warnings.

\* \* \* \* \*